July 14, 1925.
R. B. RATHBUN
1,545,975
MEANS FOR PRECIPITATING SOLIDS SUSPENDED IN GASEOUS OR OTHER FLUIDS
Filed June 23, 1923     2 Sheets-Sheet 1
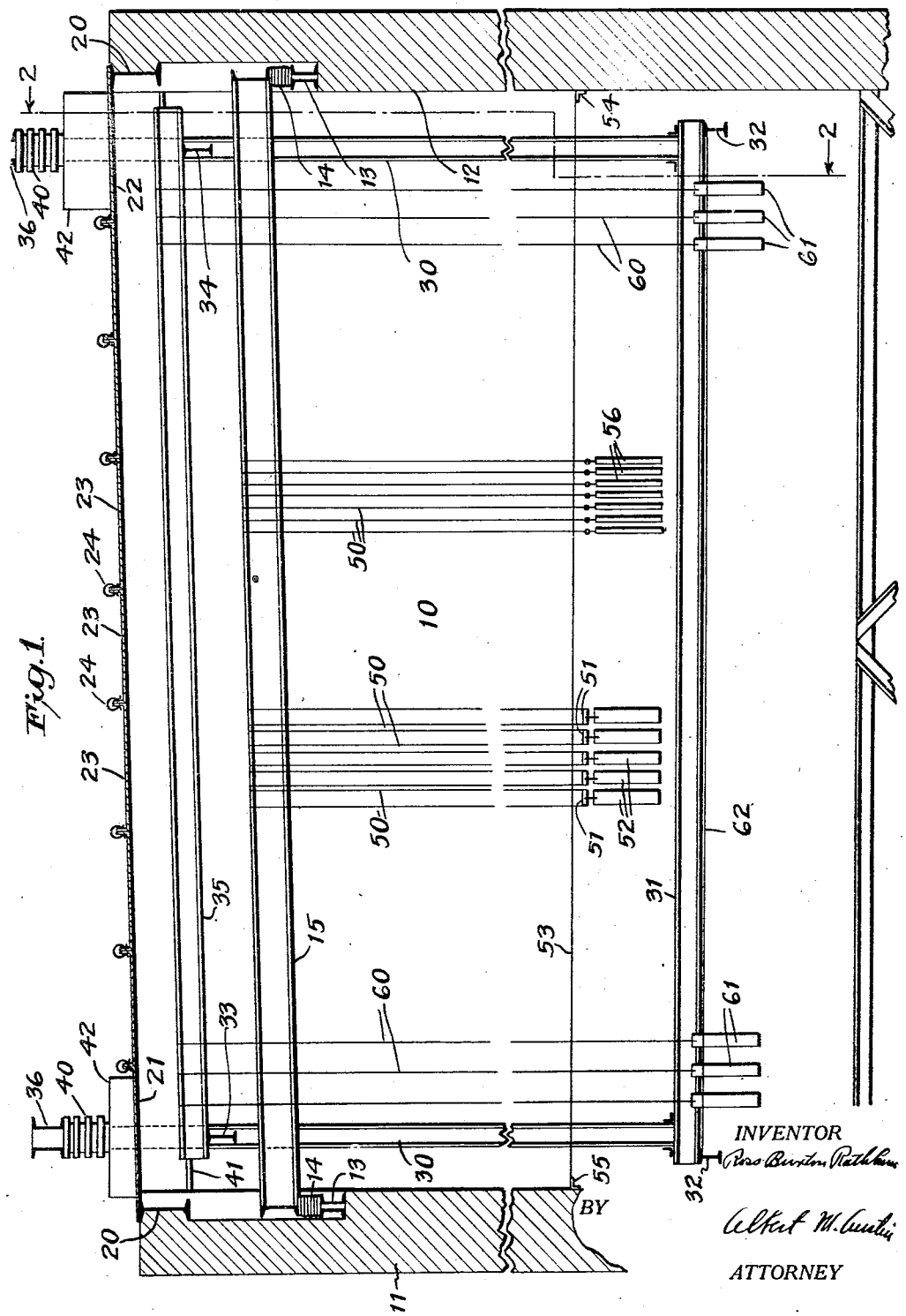
INVENTOR
Ross Burton Rathbun
BY
Albert M. Austin
ATTORNEY

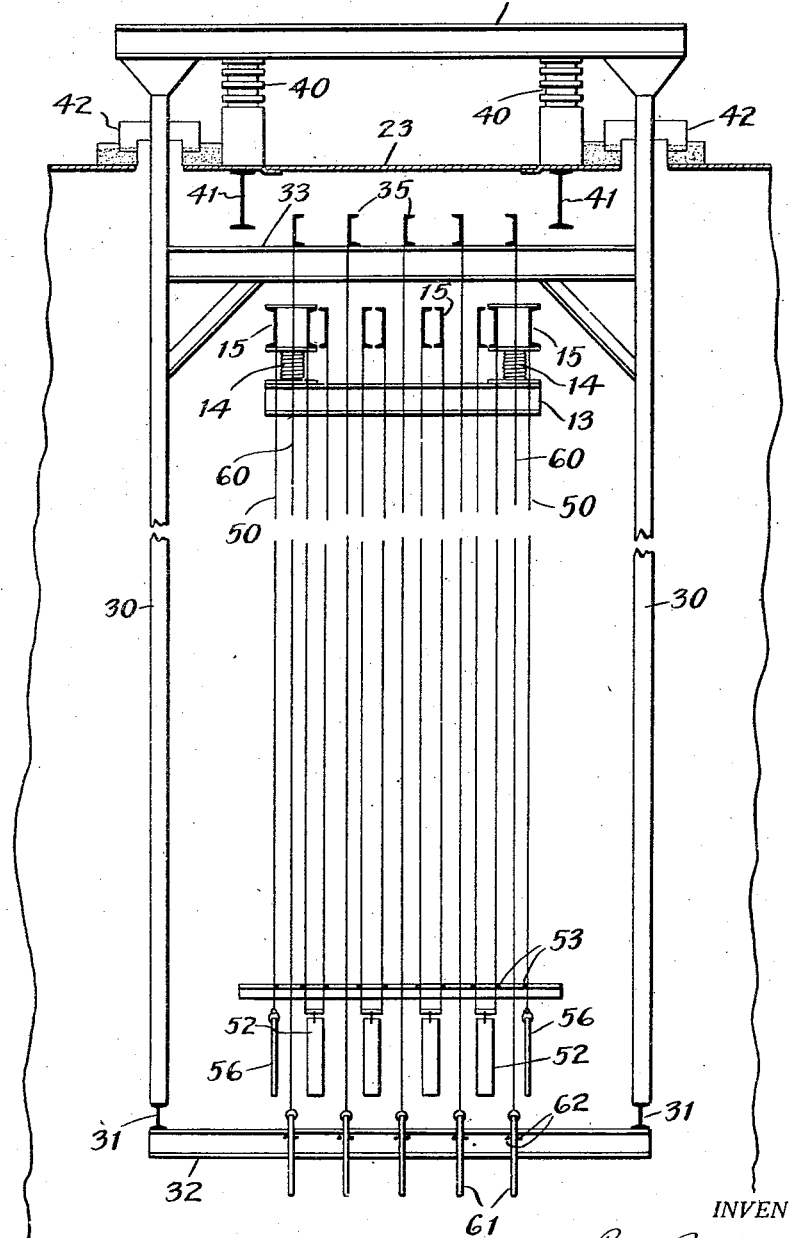

Patented July 14, 1925.

1,545,975

UNITED STATES PATENT OFFICE.

ROSS BUXTON RATHBUN, OF SALT LAKE CITY, UTAH, ASSIGNOR TO AMERICAN SMELTING AND REFINING COMPANY, OF NEW YORK, N. Y., A CORPORATION OF NEW JERSEY.

MEANS FOR PRECIPITATING SOLIDS SUSPENDED IN GASEOUS OR OTHER FLUIDS.

Application filed June 23, 1923. Serial No. 647,243.

*To all whom it may concern:*

Be it known that I, ROSS BUXTON RATHBUN, a citizen of the United States, and resident of Salt Lake City, in the county of Salt Lake and State of Utah, have invented certain new and useful Improvements in Means for Precipitating Solids Suspended in Gaseous or Other Fluids, of which the following is a specification.

This invention relates broadly to an improvement in the art of precipitating solids suspended in moving fluid streams, and particularly to the precipitation of solids by subjecting the moving fluid to the effects of an electrostatic field of force.

More particularly, the invention relates to the provision of an improved form of electrode for use in connection with this treatment of fluids.

Some of the objects of the invention are to improve the efficiency of electrical precipitation; to simplify the cost of the plant required for the precipitation; and to reduce the cost of installation and operation of such plants.

A feature of the present invention relates to the use of wires or rods suspended in vertical parallel planes across a flue or conduit in such manner as to preserve electrode spacing and to impress thereon a relatively high potential to insure uniform electrostatic conditions in the space contiguous thereto.

Another feature relates to the provision of electrodes which are suspended within the device, thus depending upon gravity for insuring desired spacing between the parts.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In order to illustrate one form of apparatus capable of carrying out the improved mode of treatment, reference is made to the accompanying drawing, in which, Figure 1 is a sectional view of a treating chamber; and Figure 2 is a sectional view taken on the line 2—2 of Figure 1.

The treating chamber shown in intended for use in a so-called electrical precipitation plant, in each of which a relatively high unipolar electric potential is used to maintain an electro-static field through which the fluids are directed. When a precipitation plant of this description is employed in connection with a smelting furnace, the flue gases from the furnace are directed through the treating chamber and subsequently conducted out through the chimney.

Like reference characters refer to like parts in the several figures of the drawings.

Referring to Figure 1, there is shown a treating chamber 10 having walls 11 and 12. The inner faces of the walls 11 and 12 are recessed near their upper ends, and there is positioned on the floor of each of the recesses so formed a plurality of metal members 13, each forming a support, and guide for a compression spring 14. The recess in the wall 12 is preferably relatively higher than the corresponding recess in the wall 11. A plurality of metal I beams 15, which may take any suitable form of truss of suitable length, are bridged across the chamber, their respective ends resting upon the upper faces of a pair of oppositely disposed compression springs 14, 14, and being yieldingly supported thereby.

For supporting the roof of the structure there is provided at the top of each wall 11 and 12 a metal I beam 20 suitably supported by and fastened to the respective wall, as by being bolted thereto by means of expansion bolts or other suitable fastening means. The roof structure comprises sheet iron structure formed in sections. The sections 21 and 22 immediately adjacent the walls 11 and 12 are preferably stationary. The intermediate sections, such as 23, 23, are preferably removable in separable units. For maintaining a substantially fluid tight seal there is provided along each edge of each section of the roof structure an angle iron secured thereto as by being riveted. A plurality of spring clips, such as 24, 24, are pressed over the adjacent sides of adjacent angle irons to maintain them in intimate contact with one another. Thus an effective seal is provided against the escape of gases, but the sections may readily be removed to permit access to the interior of the treating chamber for inspection or for finding and repairing defects.

An insulated supporting framework consisting of four or more spaced vertical metal I beams, such as 30, 30, interconnected at their lower ends by cross beams 31, 31 of a length slightly less than the width of the interior of the chamber 10. These beams are in turn interconnected at their ends by I beams 32, 32 in parallel spaced relation and which extend longitudinally of the chamber. There is also provided a plurality of beams, of which two, such as 33, 34, are shown each of said last named beams extend between a pair of the vertical beams 30, 30, and its ends are secured to the vertical beams near the upper ends thereof but within the confines of the chamber 10. The beam 34 shown at the right of Figure 1 is positioned relatively higher than the left-hand beam 33 and a plurality of beams 35 resting upon and supported by the beams 33 and 34 are thus positioned in parallelism with the beam 15. The upper ends of the vertical beams 30 are secured in pairs to tie beams 36. The beams 30 and 36 are secured together as described to form a rugged framework.

For insulating this framework, there is provided for each tie beam 36 a pair of insulators, such as 40, which rest upon the respective lateral sections 21, 22 of the roof structure. A beam or truss 41 extends across the chamber 10 and is fastened by suitable supports in the walls 11 and 12 in such manner as to reinforce the roof sections just below each pair of oppositely disposed insulators 40, so as to carry the weight of the framework. Each insulator 40 is provided for at least a portion of its length with petticoats for maintaining the electrical insulating qualities independent of atmospheric conditions. A suitable seal 42, which may be of the lime seal type shown in my co-pending application, Serial No. 392,456, for improvements in insulating lime seal, filed June 28, 1920, or any suitable seal may be provided for the vertical beams 30 where they pass through the roof. Thus an insulated structure is provided electrically insulated from the beams 15, which is simple and strong in construction.

Suspended from the beams 15 at spaced intervals are electrical conductors, such as 50, which may take the form of uninsulated or bare wire of steel or any suitable metal capable of withstanding the corrosive action of fluids passing through the conduit 10. The lower end of each wire is bent at right angles and inserted into an equalizer member, shown conventionally as a short pipe, such as 51, one such pipe connecting each two adjacent intermediate conductors, as shown in Figure 1. Supported from the middle of the pipe 51 is a weight 52 the mass of the weight being sufficiently great to keep the conductors 50 taut. A horizontal spacing conductor 53 is fastened to connecting elements 54 and 55, suitably positioned on the side walls of the conduit 10, and maintains a predetermined spacing of the conductors 50, there being one such spacing conductor for each row of vertical conductors 50. The end conductors 50 are provided at their lower ends with individual weights, such as 56, as clearly illustrated in Figure 2. The mass of each weight 56 is sufficiently great to keep the respective conductor taut.

Suspended from the beams 35 of the insulated framework, at spaced intervals, are electrical conductors, such as 60, which may take the form of insulated wire such as steel. The lower end of each insulated conductor is fastened to a weight 61, the mass of the weight being sufficiently great to keep the respective conductor taut. A horizontal spacing conductor 62, of steel or any suitable metal, is stretched across longitudinally of the conduits between the spaced beams 32, 32, as shown in Figure 2, there being two such spacing conductors for each row of vertical conductors 60 (see Figure 2).

The conductors 60 are connected in any suitable manner to one pole of a source of unidirectional electric energy, preferably to the negative pole. The source of energy should be of relatively high potential, and may include an alternator, step-up transformer and rectifier, or may take any other desired suitable form. The other pole of the source is connected through such suitable auxiliary apparatus as may be desired to the beams 15 and thus to the conductors 50.

Thus it will be seen that I have provided an electrical precipitating plant simple, easy and cheap to construct, which lends itself readily to employment in connection with existing smelters. It is easily and inexpensively maintained, as the parts are of simple construction and stationary, and defects are not likely to develop. Such repairs as may be required, including periodic cleaning and inspection, are easily made, as access to the interior is rendered easy by the novel roof construction.

Short circuits of the high tension are effectually prevented by the spacing members, which serve to prevent undesired movement of the electrodes. Furthermore the provision of weights on the lower ends of the wires tends to keep the wires taut, and thus to prevent undesired short circuits.

The use of a suspended wire has many points of advantage over prior constructions, as it provides an effective screen which does not warp and preserves an accurate alinement and spacing of the parts. The lower ends of the discharge electrodes extend below the lower ends of the opposed grounded electrodes, and thus interference with the rigid cross member by the discharge electrodes is effectively avoided.

The device may be readily cleaned by merely raising the weights slightly and allowing them to drop, thus delivering a sharp blow to the wire and releasing accumulated material therefrom.

While I have shown and described and have pointed out in the annexed claims certain novel features of my invention, it will be understood that various omissions, substitutions and changes in the form and details of the device illustrated and in its operation may be made by those skilled in the art without departing from the spirit of my invention.

Having described my invention, I claim:

1. In an electric precipitator, the combination of a conduit for fluids, means for creating an electrostatic field in said conduit, said means comprising a plurality of wire electrodes suspended within said conduit, some of said wire electrodes being greater in length than the remainder, and spacing means for the longer ones of said electrodes engaging said electrodes at portions thereof other than the portion coextensive with the shorter electrodes.

2. In an electric precipitator, the combination of a conduit for fluids, means for creating an electrostatic field in said conduit, said means comprising a plurality of wire electrodes suspended within said conduit, some of said wire electrodes extending below the level of the lower ends of the others of said electrodes, and spacing means for the longer ones of said electrodes engaging said electrodes at portions thereof other than the portion coextensive with the shorter electrodes.

3. A wire electrode precipitator for gases comprising a pair of frames insulated from each other, each being provided with suspended wires forming terminals of a high potential electric circuit, the wires of one polarity being coextensive with a portion of the wires of the other polarity, and means for spacing the wires extending in proximity to the remaining portion of the last named wires.

4. A wire electrode precipitator for gases comprising a pair of supports insulated from each other, each being provided with suspended wires forming terminals of a high potential electric circuit, the wires of one terminal being less in length than those of the other terminal, and spacing members for maintaining oppositely poled electrodes spaced apart.

5. In a precipitator, wire electrodes positioned therein, an equalizer member for two of said wires and secured to the lowermost ends thereof, and a weight suspended from said member.

6. In a precipitator, wire electrodes positioned therein, an equalizer member for two of said wires and having its ends secured to the lowermost ends of the respective wires and a weight suspended from the intermediate portion of said member.

7. In a precipitator, wire electrodes positioned therein, an equalizer member for two of said wires and having its ends secured to the lowermost ends of the respective wires and a weight suspended from the middle of said member.

Signed at El Paso in the county of El Paso and State of Texas this 18th day of June A. D. 1923.

ROSS BUXTON RATHBUN.